United States Patent [19]

Bernhardt et al.

[11] 4,326,500

[45] Apr. 27, 1982

[54] SOLAR RADIATION COLLECTOR

[75] Inventors: Winfried Bernhardt; Edgard Grundmann; Rudolf Kroll, all of Wolfsburg, Fed. Rep. of Germany

[73] Assignee: Volkswagenwerk Aktiengesellschaft, Wolfsburg, Fed. Rep. of Germany

[21] Appl. No.: 116,814

[22] Filed: Jan. 30, 1980

[30] Foreign Application Priority Data

Feb. 1, 1979 [DE] Fed. Rep. of Germany ....... 2903828

[51] Int. Cl.³ .................................................. F24J 3/02
[52] U.S. Cl. .................................... 126/426; 126/438; 126/450
[58] Field of Search ............... 126/426, 444, 445, 449, 126/450; 165/46

[56] References Cited

U.S. PATENT DOCUMENTS 3,249,682  5/1966  Laing ................................... 126/444
4,059,095  11/1977  Grundmann ........................ 126/426

FOREIGN PATENT DOCUMENTS 1506576  5/1978  United Kingdom ................. 126/426

*Primary Examiner*—James C. Yeung
*Attorney, Agent, or Firm*—Spencer & Kaye

[57] ABSTRACT

In a solar radiation collector composed of a mat formed of a black foil member and a radiation pervious foil member, the two members being connected together along the outer edges of the mat and at interior locations of the mat to form an inlet and outlet and an extended flow path for a fluid heat carrier medium between the inlet and outlet, the collector further including a cover connected to the mat along opposed edges thereof and arranged to be disposed in the path of solar radiation toward the mat with an air space being defined between the mat and the cover, with the connections at interior locations of the mat serving to form parallel flow channels defining portions of the flow path and extending parallel to the opposed edges of the mat along which the cover is connected such that the dimension of the mat between the opposed edges at which the cover is connected has a first value when the mat does not contain heat carrier medium and is in a flattened state and a second value less than the first value when the mat is filled with heat carrier medium and is thus in an inflated state, the cover is constructed such that when flat its dimension between the opposed edges has the first value, and the cover is provided with elements rendering it elastically resilient for causing the cover to assume an arched configuration which is concave toward the mat and defines a chamber with the mat when the dimension between the opposed edges attains the second value.

8 Claims, 6 Drawing Figures 4,326,500

SOLAR RADIATION COLLECTOR

BACKGROUND OF THE INVENTION

The present invention relates to a solar radiation collector of the type composed of a mat formed of a black foil member and a radiation pervious foil member, the two members being connected together along the outer edges of the mat and at interior locations of the mat to form an inlet and outlet and an extended flow path for a fluid heat carrier medium between the inlet and outlet, the collector further including a cover connected to the mat along opposed edges thereof and arranged to be disposed in the path of solar radiation toward the mat with an air space being defined between the mat and the cover, with the connections at interior locations of the mat serving to form parallel flow channels defining portions of the flow path and extending parallel to the opposed edges of the mat along which the cover is connected such that the dimension of the mat between the opposed edges at which the cover is connected has a first value when the mat does not contain heat carrier medium and is in a flattened state and a second value less than the first value when the mat is filled with heat carrier medium and is thus in an inflated state.

Solar radiation collectors of this type, which have the advantage of being collapsible or rollable for transport, are disclosed in U.S. Pat. No. 4,059,095, and are composed of a mat which includes when viewed in the direction toward the radiation source, a lower, black foil member, and an upper, transparent, or radiation pervious, foil member, associated with a further transparent, or radiation pervious foil member which constitutes a cover and which is welded to the mat at those points at which the two foil members forming the mat are connected together. Between the mat on the one hand and the further transparent foil member forming the cover on the other hand, there are created heat insulating chambers filled with air.

SUMMARY OF THE INVENTION

It is an object of the present invention to provide a solar radiation collector of the above described type which, in the collapsed or rolled-up state, takes up a minimum amount of space and, when put into operation, i.e. particularly upon being filled with fluid heat carrier medium, requires no additional means to form the above-described air-filled chamber or chambers between the mat and the cover.

These and other objects are achieved, in a solar radiation collector of the type described above, by the improvement wherein the cover is constructed such that when flat its dimension between the opposed edges has the first value, and the cover comprises means rendering it elastically resilient for causing the cover to assume an arched configuration which is concave toward the mat and defines a chamber with the mat when the dimension between the opposed edges attains the second value.

During the times when a solar radiation collector according to the invention is not in operation, the collector, unless it is folded or rolled up assumes a flat configuration since the two foil members forming the mat as well as the cover lie flat on top of one another. Filling of the mat with heat carrier medium, however, deforms the mat in such a manner that flow channels having a more or less circular cross section are formed. This formation of flow channels is accompanied by a reduction in the dimension of the mat perpendicular to these flow channels so that the edges of the cover which are connected with the mat approach one another. The cover is then deformed from its relaxed, flat shape into an upwardly curved configuration since the deformation force generated by the flow medium is sufficient to overcome the elastic resistance which the cover is designed to present to such deformation. Care must of course be taken that air can enter into the thus resulting interstice between the cover on the one hand and the mat on the other.

As soon as the flow medium has been removed again from the mat, the resilience of the cover acts to restore a planar configuration to the cover and the mat.

Advantageously the cover includes a further transparent, or radiation pervious, foil member as well as resilient elastic slats extending transversely to the above-mentioned edges of the foil. In the extended state, these slats are essentially unstressed. If these slats are disposed on the outside of the further radiation pervious foil member i.e. on the side of this foil member facing away from the mat, they must be connected with the further transparent foil member over their entire length, for example by gluing. This is not necessary if the slats are arranged at the surface of the further foil member which is disposed toward the mat or if the cover is constituted by two foil members with the slats disposed between them.

In order for the passage of solar radiation not to be impeded, the slats are advisably also made of a transparent material, for example methyl methacrylate polymers of the type sold under the trademark Plexiglas. Efficiency can be increased by expediently covering the inside of the cover with a reflecting coating in the area of one edge zone.

DESCRIPTION OF THE PREFERRED EMBODIMENTS

Figure 1:
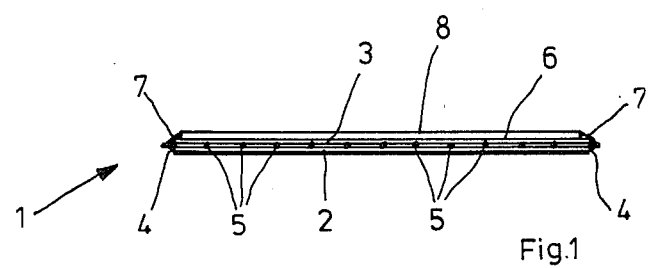
FIG. 1 is a simplified cross-sectional end view of a preferred embodiment of a solar radiation collector according to the invention before filling with heat carrier medium.

FIG. 1 shows a mat 1 formed of a black foil member 2 and a transparent or radiation pervious, foil member by weld or heat-sealed seams. Such weld seams are present along the edges of the foil members at 4 as well as at locations enclosed by the edges so as to form flow channel 5. Such a design is disclosed in principle in the above-cited U.S. Pat. No. 4,059,095. On the side of the mat 1 facing the source of solar radiation, there is disposed a further, transparent, or radiation pervious foil member 6 which is welded, or heat sealed, to the mat 1 only along its edges at 7. In this embodiment, the further, transparent foil member 6 has transversley oriented slats 8 of an elastically resilient transparent material fastened to its outer surface.

Figure 2:
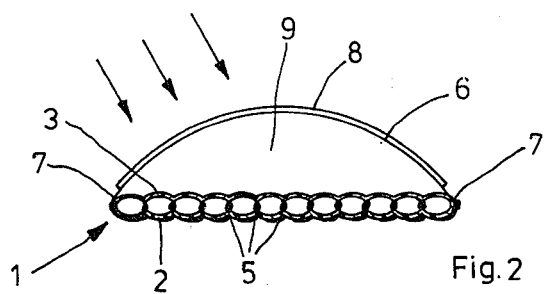
FIG. 2 is a similar cross-sectional view of the collector in the operational state.

In the form shown in FIG. 1, which shows the collector when it is not in operation, the slats 8 are relaxed while after the mat 1 has been filled with the heat carrier medium they are bent by the then occurring reduction of the transverse dimension of the mat 1 against their elastic resetting force into the upwardly arched shape shown in FIG. 2 taking along the further, transparent foil member 6. Foil 6 then forms, together with the slats 8, an elastic cover which during operation of the solar radiation collector forms the air-filled space or chamber 9 between itself and the mat 1.

While the slats 8, due to their elasticity and their connection with the further, transparent foil member 6, cause the cover 6, 8 to automatically become curved when the mat 1 is expanded by the introduction of the heat carrier medium, the restoring fact of the slats promotes emptying of the mat 1 since the slats tend to pull the mat into the shape shown in FIG. 1 in which the two foil members 2 and 3 of the mat lie flatly one on top of the other.

Figure 3:
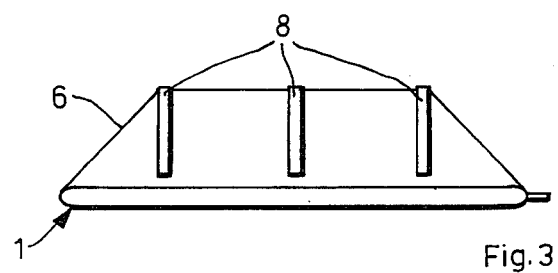
FIG. 3 is a side elevational view of the arrangement of FIG. 2.

FIG. 3 is a side view of the arrangement shown in FIG. 2 and illustrates the manner in which several slats 8 are distributed across foil member 6. FIG. 3 further shows one possible configuration for member 6 in which the ends, which are closed by suitable foil wall members to create the closed chamber 9, are formed to slant upwardly from respective edges of mat 1 to the top of member 6.

Figure 4:
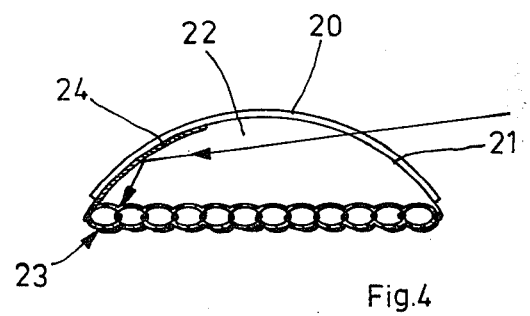
FIGS. 4, 5 and 6 are cross-sectional views similar to that of FIG. 2 of another embodiment of the invention.

The same effect is achieved by the embodiment of the invention shown in FIG. 4 which differs from the above-described embodiment only in that the further, transparent foil member 21, which again is connected with external slats 20 and which is provided to form an insulating, air-filled chamber 22 above the mat 23 is partially covered with a reflecting coating 24 in a region starting at the left-hand edge in the drawing. Especially when the sun is at a low position, the coating 24 reflects solar radiation, as indicated by the arrows, in the direction toward the mat 23, which radiation would otherwise leave the solar radiation collector practically without effect.

Once the heat carrier medium has been removed from the mat, the above-described embodiments of the invention can easily be rolled up in a direction transverse to the orientation of the slats.

Figure 5:
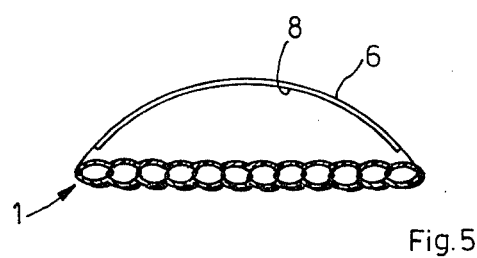
Figure 6:
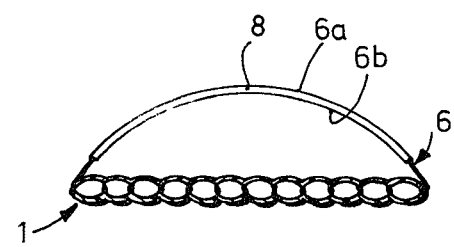

This also applies to the embodiments shown in FIGS. 5 and 6 which differ from the embodiment of FIGS. 2 and 3 only by the slats 8 lying on the inner surface of foil member 6 (FIG. 5) or between two foils 6a and 6b being connected over their facing surfaces to constitute foil member 6 (FIG. 6) respectively.

It will be understood that the above description of the present invention is susceptible to various modifications, changes and adaptations, and the same are intended to be comprehended within the meaning and range of equivalents of the appended claims.

What is claimed is:

1. In a solar radiation collector composed of a mat formed of a black foil member and a further foil member being preferably pervious to radiation, the two members being connected together along the outer edges of the mat and at interior locations of the mat to form an inlet and outlet and an extended flow path for a fluid heat carrier medium between the inlet and outlet, the collector further including a cover connected to the mat along opposed edges thereof and arranged to be disposed in the path of solar radiation toward the mat with an air space being defined between the mat and the cover, with the connections at interior locations of the mat serving to form parallel flow channels defining portions of the flow path and extending parallel to the opposed edges of the mat along which the cover is connected such that the dimension of the mat between the opposed edges at which the cover is connected has a first value when the mat does not contain heat carrier medium and is in a flattened state and a second value less than the first value when the mat is filled with heat carrier medium and is thus in an inflated state, the improvement wherein said cover is constructed such that when flat its dimension between said opposed edges has said first value, and said collector further comprises at least one elastically resilient body attached to said cover for causing said cover to assume an arched configuration which is concave toward said mat and defines a chamber with said mat when said dimension between said opposed edges attains said second value.

2. In a solar radiation collector composed of a mat formed of a black foil member and a further foil member being preferably pervious to radiation, the two members being connected together along the outer edges of the mat and at interior locations of the mat to form an inlet and outlet and an extended flow path for a fluid heat carrier medium between the inlet and outlet, the collector further including a cover connected to the mat along opposed edges thereof and arranged to be disposed in the path of solar radiation toward the mat with an air space being defined between the mat and the cover, with the connections at interior locations of the mat serving to form parallel flow channels defining portions of the flow path and extending parallel to the opposed edges of the mat along which the cover is connected such that the dimension of the mat between the opposed edges at which the cover is connected has a first value when the mat does not contain heat carrier medium and is in a flattened state and a second value less than the first value when the mat is filled with heat carrier medium and is thus in an inflated state, the improvement wherein said cover comprises a radiation pervious foil member and is constructed such that when flat its dimension between said opposed edges has said first value, and said collector further comprises a plurality of elastic slats fastened to said foil member of said cover, extending between said opposed edges and assuming a flat configuration when in their unstressed state, said slats cooperating with said cover for causing said cover to assume an arched configuration which is concave toward said mat and defines a chamber with said mat when said dimension between said opposed edges attains said second value.

3. An arrangement as defined in claim 2 wherein said slats are made of an essentially radiation pervious material.

4. An arrangement as defined in claim 2 or 3 wherein said slats are disposed at the outside of said foil member of said cover and are connected therewith over their entire length.

5. An arrangement as defined in claim 2 or 3 wherein said slats are disposed at the surface of said foil member of said cover which faces said mat.

6. An arrangement as defined in claim 2 or 3 wherein said cover comprises a second radiation pervious foil member and said slats are disposed between said foil members of said cover.

7. An arrangement as defined in claim 2 or 3 wherein said cover further comprises a reflecting region which is adjacent to one of its said edges of said mat along which said cover is connected.

8. An arrangement as defined in claim 1 or 2 wherein said cover further comprises a reflecting region which is adjacent to one of said edges of said mat along which said cover is connected.

* * * * *